(No Model.)

F. S. HOGG.
FENDER FOR TRAM CARS.

No. 518,571. Patented Apr. 17, 1894.

WITNESSES:
J. A. Bergstrom
C. Sedgwick

INVENTOR
F. S. Hogg
BY Munn & Co.
ATTORNEYS.

THE NATIONAL LITHOGRAPHING COMPANY,
WASHINGTON, D. C.

UNITED STATES PATENT OFFICE.

FRANKLYN S. HOGG, OF NEW YORK, N. Y.

FENDER FOR TRAM-CARS.

SPECIFICATION forming part of Letters Patent No. 518,571, dated April 17, 1894.

Application filed November 6, 1893. Serial No. 490,128. (No model.)

*To all whom it may concern:*

Be it known that I, FRANKLYN S. HOGG, of New York city, in the county and State of New York, have invented a new and Improved Fender for Tram-Cars, of which the following is a full, clear, and exact description.

My invention relates to an improvement in fenders for tram cars, and it has for its object to provide a fender of exceedingly simple and durable construction and one which may be concealed entirely beneath the platform of a car.

A further object of the invention is to construct the fender in such manner that the fender proper will be provided with a rear guard, which guard, when the fender proper is carried down toward the ground to ward off an obstruction will be carried rearwardly, or in direction of the wheels of the car, and wherein when the main fender fails to act, that is, should the main fender be elevated by an obstruction working beneath it, the guard or auxiliary fender will be brought down in operative position between the rails, and thereby prevent any person or obstruction from passing beneath the wheels.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
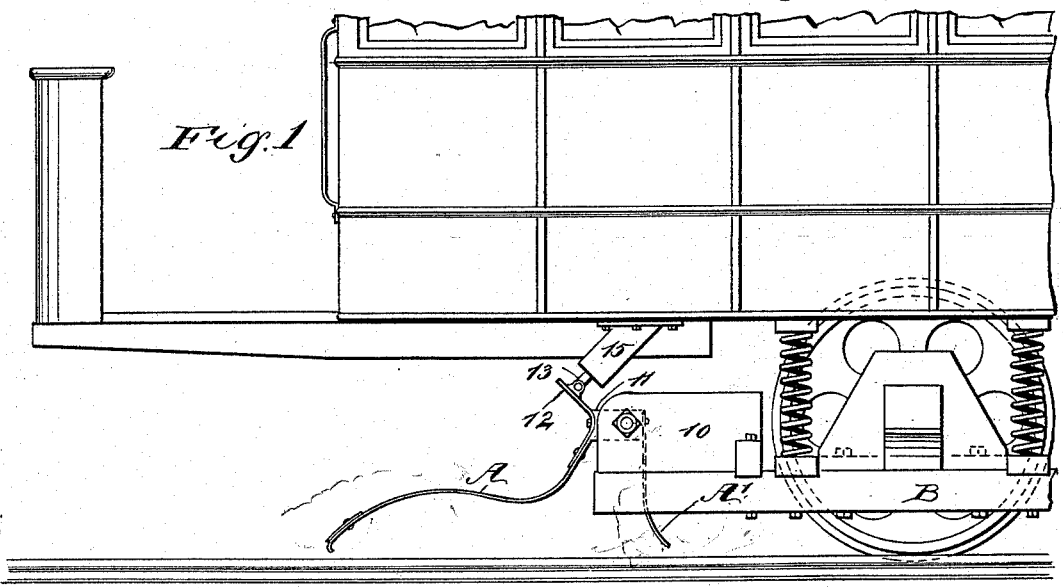
Figure 2:
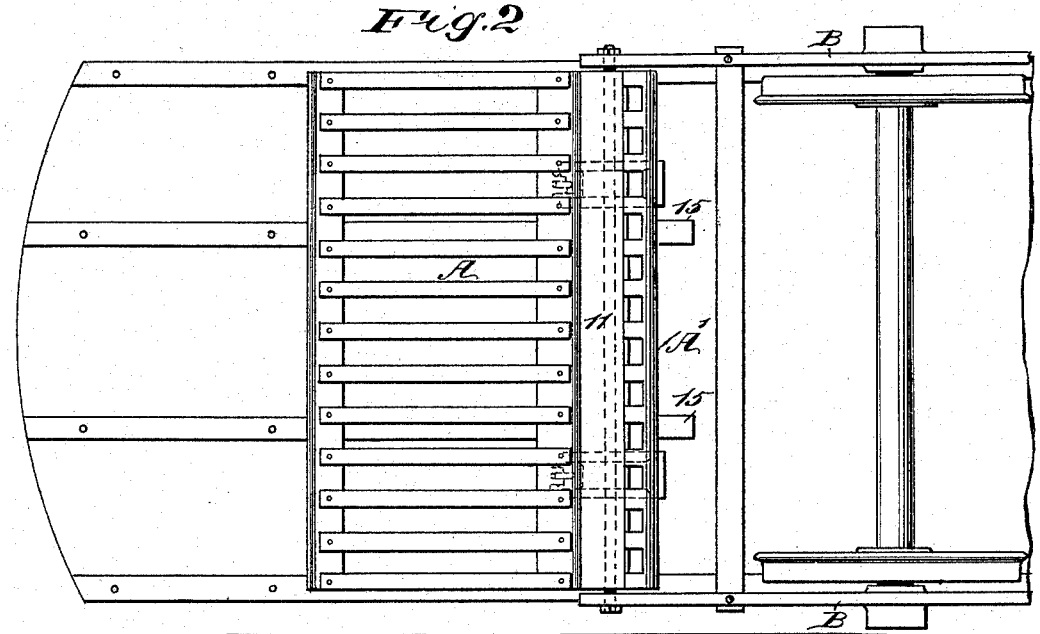
Figure 4:
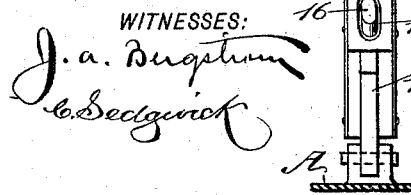
Figure 3:
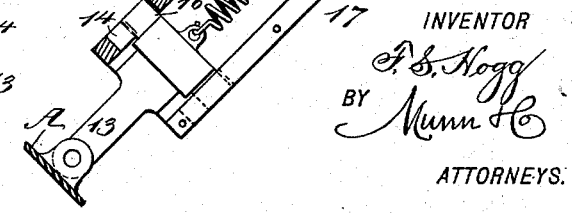

Figure 1 is a side elevation of a car, and the improved fender applied thereto. Fig. 2 is a bottom plan view of the fender. Fig. 3 is a detail sectional view of one of the hangers of the fender; and Fig. 4 is a plan view of the hanger.

In carrying out the invention, horizontal brackets 10, are located upon the outer end portions of the forward truck B of the car, and the upper forward ends of the brackets are rounded off, as shown in Fig. 1. The brackets are adapted to journal the ends of a shaft 11, which shaft may be, and preferably is, rectangular in cross section, except at its extremities. The shaft is adapted to carry a main fender A, and an auxiliary or guard fender A'. The main fender is attached to the front portion of the shaft, and extends practically its entire length. The body of the fender A, is bent downward and slightly forward from the shaft, and is then curved downwardly and forwardly in direction of the ground, while the top portion of the fender, designated as 12, is carried upwardly and outwardly from the shaft, as shown in Fig. 1. The upper portion 12 of the main fender A, is slatted, and likewise the lower portion of the main fender; but the body of the fender may be made up of a series of bars, as shown in Fig. 2, or it may be solid, or be constructed from a woven wire, a net-work of cord, or the equivalents thereof.

The main fender A, is controlled through the medium of plungers 13, the said plungers being secured in any suitable or approved manner to the rear face of the upper portion of the said fender. The plungers 13, are held to slide in slide-ways or slots 14, of predetermined length, produced in hangers 15, as shown in Figs. 3 and 4, and the hangers occupy somewhat of a diagonal position with respect to the bottom of the car, and are secured to the said bottom, or to any adjacent fixed support. The hangers are ordinarily but two in number, although more may be employed if found desirable, and the hangers are of such width as not to interfere with any running gear, grip or brake mechanism that may be beneath the car.

The head of the plunger 13 is provided with trunnions 16, and the said trunnions have movement in the slots or slide-ways 14 of the hangers. The plungers are held in an upper position, that is, in position to maintain the fender A a predetermined distance from the ground through the medium of springs 17, which are secured to the heads of the plungers and to the hangers, as shown in Fig. 3. Therefore, when an obstruction is on the track in front of the car, and passes beneath the platform, the obstruction upon striking the fender A, will cause the fender to be pushed downward between the rails a sufficient distance to prevent the object from passing under the fender, and the fender will likewise act either to carry the object, or to direct it to one side of the track. As the movement of the plungers 13 is limited, the main fender A will never be brought to an engagement with the ground.

The auxiliary fender A', is attached at its upper end to the rear portion of the shaft 11, and the auxiliary or guard fender is carried downward in direction of the ground and then in a rearwardly direction, or in direction of the wheels; and when the main fender is pressed downward the auxiliary fender will be elevated to a slight extent, but in the event any object should by any possibility get beneath the main fender so as to raise the same, the rear auxiliary or guard fender will be carried forwardly and downwardly in direction of the ground, and will receive the object which has passed beneath the main fender and prevent said object getting beneath the wheels or beneath the truck of the car.

The fender is exceedingly simple, it is durable and it is effective in operation, while it may be applied to any car without interfering with the mechanism at the bottom thereof; furthermore, the fender being located beneath the platform does not add to the length of the car, and enables the car to be stored as readily as though the fender were not in position thereon.

Having thus described my invention, I claim as new and desire to secure by Letters Patent—

1. In a tram car or like vehicle, a fender having pivotal connection with the vehicle, and spring controlled plungers connected to the fender and having limited sliding movement in bearings on the vehicle frame, substantially as described.

2. In a tram car or like vehicle, a rock shaft, a fender secured to the forward face of the rock shaft, extending downwardly and forwardly therefrom, a second fender extending from the opposite side of the shaft, plungers connected with the main fender, and means, substantially as shown and described, for limiting the movement of the plungers, as and for the purpose set forth.

3. In a fender for tram and other cars, the combination, with a fixed support, and a shaft journaled in the support, of a fender secured to the forward face of the shaft, an auxiliary or guard fender attached to the rear face of the shaft, one fender being elevated when the other is depressed, and a spring-controlled guide mechanism controlling the movement of the shaft, as and for the purpose set forth.

FRANKLYN S. HOGG.

Witnesses:
J. FRED ACKER
E. M. CLARK.